Feb. 1, 1949.   G. HALLEWELL   2,460,501
SPEED CONTROL GEAR OF PRIME MOVERS
Filed July 17, 1944   2 Sheets-Sheet 1

INVENTOR
George Hallewell
By Watson, Cole, Grindle & Watson

Patented Feb. 1, 1949

2,460,501

UNITED STATES PATENT OFFICE 2,460,501

SPEED CONTROL GEAR OF PRIME MOVERS

George Hallewell, Stamford, England, assignor to Blackstone & Company Limited, Stamford, England, a British company Application July 17, 1944, Serial No. 545,311
In Great Britain May 21, 1943

Section 1, Public Law 690, August 8, 1946
Patent expires May 21, 1963

5 Claims. (Cl. 264—3)

1

This invention comprises improvements in or relating to speed control gear of prime movers. Prime movers are ordinarily controlled as to speed by centrifugal governors, but in addition means are sometimes required to permit the speed of the prime mover to be varied by operation at a distance and apparatus has been proposed for effecting this by using solenoids with ratchet and screw mechanism or a reversing electric control motor, the idea being that the control apparatus operates by power transmitted to it from a distance to modify in some manner the regulating means of the engine and thus to alter its speed. It is an object of the present invention to provide an improved remote control gear which can conveniently be employed on prime movers, particularly for convenient synchronisation and paralleling of alternating current generating sets, although the invention is not limited to such an application.

According to the present invention a prime mover is provided with governor control gear comprising operative connections from a shaft driven by the prime mover to a device for altering the speed response of the governor, regulating means in said operative connections for setting them in action and remote control means for determining the operation of the said regulating means.

Preferably, the regulating means in the operative connections referred to may consist of a reversing clutch mechanism which, when operated in one direction, clutches the shaft driven by the prime mover to a driven element of the operative connections so as to bring about alteration of the speed response in one direction and when moved in the opposite direction reverses the alteration of speed response.

The invention also includes means to prevent movement of the operative connections beyond predetermined limits as hereinafter described.

The following is a description by way of example of one construction of governor control gear in accordance with the invention, reference being made to the accompanying drawing in which.

Figure 1:
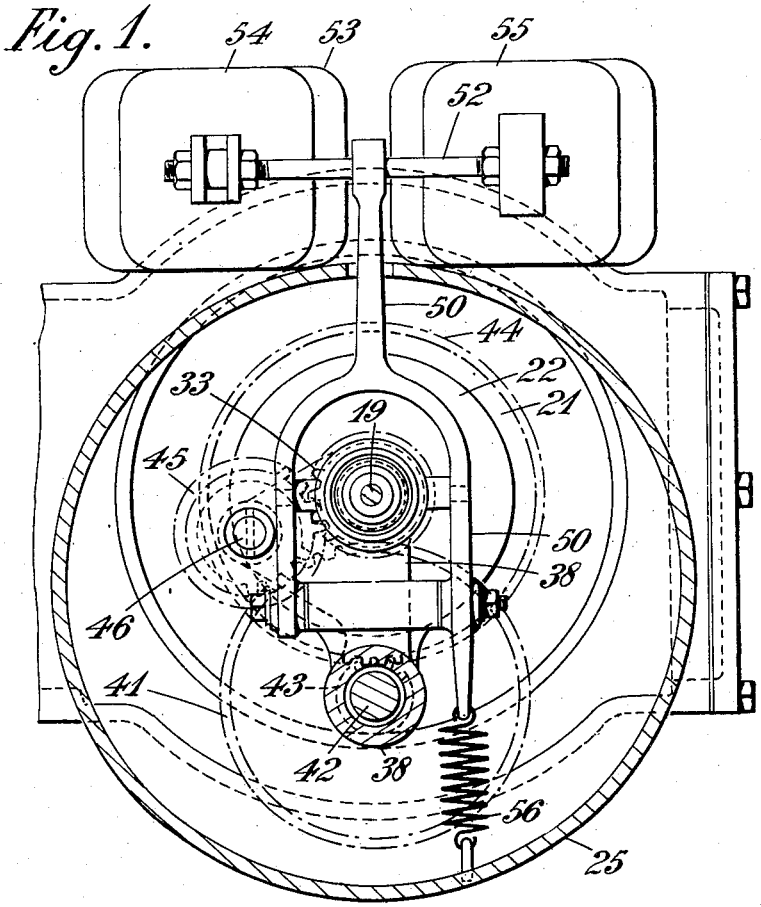
Figure 1 is an end view of the governor control gear, partly in section upon the line 1—1 of Figure 2, looking in the direction of the arrows.
Figure 3:
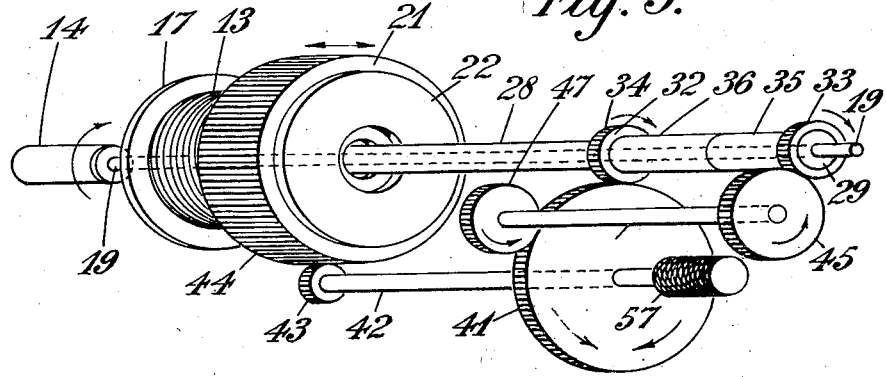
Figure 3 is a diagrammatic perspective view of the essential parts of the gearing.

The gear is intended to be applied to an engine, the speed of which is controlled by a centrifugal governor having rotating weights 11, 12, outward movement of which is resisted by a spring 13 coaxial with the governor shaft 14. The actual construction of the governor itself is not material to the present invention and therefore the governor shaft 14 and the weights 11, 12 are indicated only in outline. It will be understood that the governor is such that outward movement of the governor weights causes a sleeve 16 to move to the right as viewed in Figure 2 and to compress the spring 13 which bears on the end of the sleeve 16 through the intermediary of a collar 17 and ball thrust bearing 18.

In the apparatus according to the present invention, the governor weights are enclosed by a casing 15 and the casing is provided with a screw-threaded extension 20 coaxial with the governor shaft, upon which extension there is mounted a hollow nut 21. The nut 21 has an inwardly-projecting flange 22 at one end and the flange supports the end of the governor spring 13 so that rotation of the nut will screw up or release the spring, according to the direction of rotation, and will so alter the speed-response of the governor. If the nut 21 is screwed up to compress the spring 13, the governor will tend to cause the engine to move faster and, if it is unscrewed to release the spring, the governor will regulate the engine to run more slowly.

The end of the governor shaft 14 is provided with an extension shaft 19, coaxial with the governor shaft and projecting through the central aperture within the aforesaid flange 22 on the nut. This extension shaft 19 will hereinafter be referred to as the operating shaft, as it serves to operate the mechanism for moving the nut.

A control casing 25 is provided, secured to the governor casing 15 and through this control casing the operating shaft 19 extends and finds support in a bearing 26 in the end-flange 27 of the casing. Upon the operating shaft 19 is a sleeve 28 slidably keyed to the shaft.

The sleeve carries two oppositely-facing clutch-cones 29, 30 and surrounding the sleeve are two hollow cone clutch-members 31, 32 one mating with one of the clutch cones on the sleeve and the other mating with the other clutch cone. The hollow clutch members 31, 32 each carry gear teeth 33, 34 respectively on their periphery, and have hollow shanks 35, 36 which are supported in a bearing 37 in a bracket 38 projecting inwardly from the end-plate 27 of the casing 25. The thrust of the cone clutches when engaged is taken up by ball thrust races 39, 40 between the hollow clutch members and the ends of the bearing 37. The gear teeth 34 on one of the clutch members 32 mesh with a gear wheel 41 on a lay-shaft 42 parallel with the operating shaft 19 and the lay-shaft 42 carries a pinion 43 to mesh with gear teeth 44 cut in the periphery of the hollow nut 21 aforesaid, which regulates the force of the governor spring.

The other hollow clutch member 31 carries gear teeth 33 which mesh with an idle wheel 45 on a second lay-shaft 46 and the second lay-shaft 46 carries a pinion 47 to mesh with the gear wheel 41 driving the first lay-shaft 42.

Figure 2:
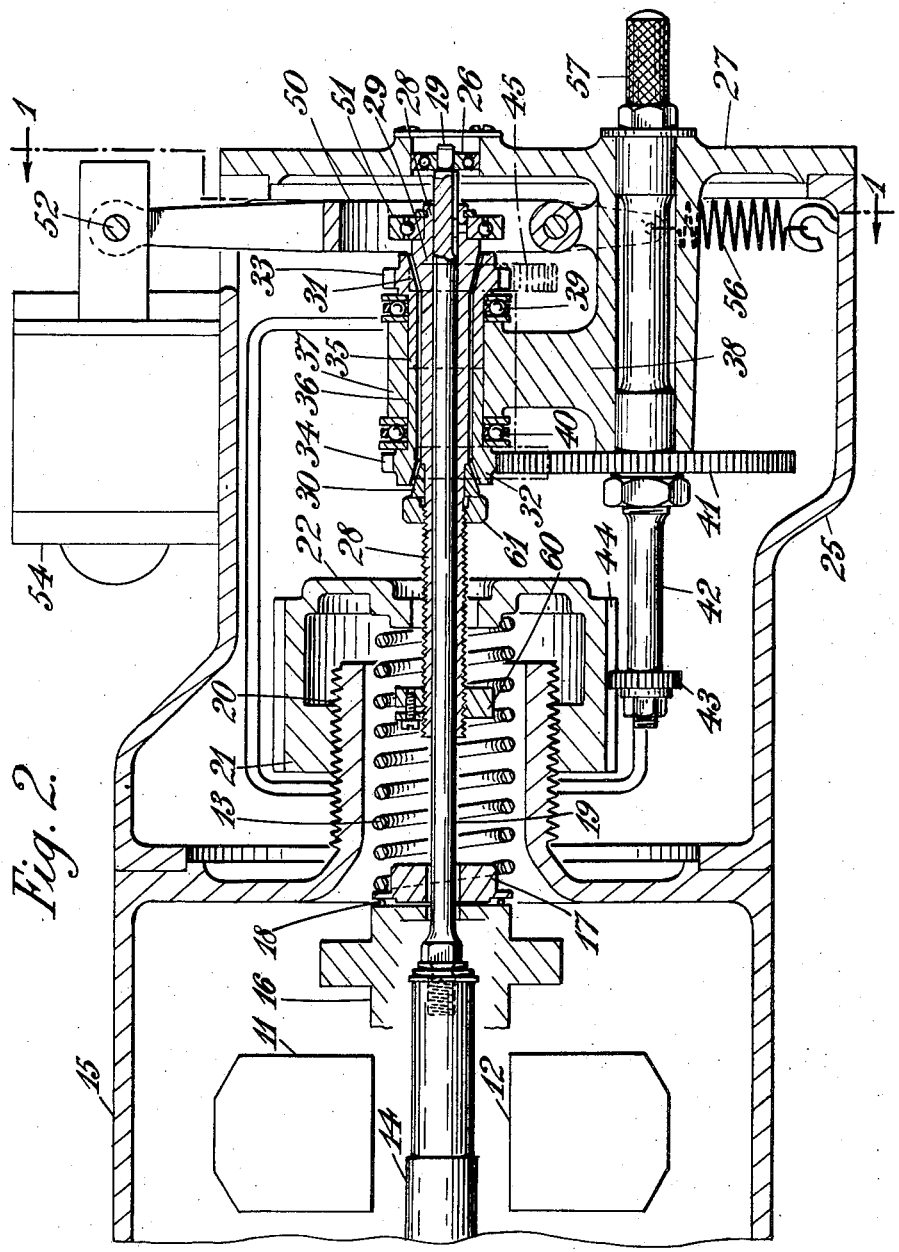
Figure 2 is a longitudinal central section taken in a plane at right angles to Figure 1.

Thus, if the sliding spindle 28 on the operating shaft is moved longitudinally to the left as viewed in Figure 2 it will engage the hollow clutch member 32 and will drive the lay-shaft 42 through the gear wheel 41 thereof and rotate the nut 21 in one direction. If the sliding spindle 28 is moved from its central position to the left it will engage the other hollow clutch member 31 and drive through gear teeth 33 and wheel 45 the second lay-shaft 46 and thence on to the first lay-shaft 42, which will therefore be rotated in the opposite direction and the hollow nut 21 will be oppositely moved accordingly. It will be understood that the hollow nut which controls the governor spring has gear teeth 44 of such length that they remain in mesh with the pinion 43 on the first lay-shaft 42 in all positions of the nut.

In order to move the sliding sleeve 28 in one direction or the other there is provided a rocking lever 50 having a forked connection with a collar 51 on the sliding spindle and the rocking lever extends to the outside of the control casing where it is engaged by a yoke 52 connected to a push-pull solenoid 53 having two windings 54, 55. Energisation of winding 55 will pull the rocking lever to the left as viewed in Figure 2 and energisation of the other winding 54 will push it to the right. The pull solenoid winding 55 will engage the clutch surfaces which tend to release the governor spring and the push solenoid winding 54 will engage the clutch surfaces which tend to compress the governor spring. A centralising spring 56 ensures that the forked clutch-operating lever 50 returns to the mid-position and disconnects the gear when neither of the solenoids is energised.

The first lay-shaft 42 is supported in the bearing-bracket 38 in the control casing and projects outside the casing, where it carries a knurled head 57 which permits manual adjustment of the governor spring whenever the solenoids are not energised.

The solenoid windings are connected to a remote control push-button or other switch by which one winding can be energised in order to make the engine move more slowly, and the other winding energised in order to make it move more quickly, and thus remote control of the speed is effected.

It is important that movement of the hollow nut 21 should not be continued, under power supplied through the operating shaft, beyond its proper limits. To this end the part of the sliding sleeve 28 which passes through the flange 22 in the nut is screw-threaded as shown in Figure 2 and provided with two stop nuts 60, 61, one inside the hollow nut and the other outside it. These stop nuts can be screwed to any predetermined limiting position on the sliding spindle and there locked by appropriate means. The arrangement of the parts is such that when the nut 21 is screwed out it disengages the clutch-cone 29 which tends to drive it outwards, as soon as it engages the outer stop nut 61, by causing the nut to move the sliding spindle 28 longitudinally into the position of disengagement. When the clutch-cone 30 at the other end has been engaged it will tend to drive the nut inwardly but it will be disengaged as soon as flange 22 of the hollow nut 21 engages the inner stop nut 60. This disengagement being positively effected by the screw-thread on the extension 20 on which nut 21 runs, will override the action of the solenoid 53, so that disengagement takes place even although the solenoid may be kept energised.

Although in the specific mechanism shown in the drawings and described above the reversing clutch mechanism which operates the gearing to move the governor control nut in one direction or the other comprises two cone friction clutches it will be understood that any other desired form of clutch might be adopted. For example toothed or serrated mating faces might be employed either on conical clutch members or sliding cylindrical members or between flat faces like a dog clutch. Again an offset pin or pins in one member of the clutch might engage with a corresponding hole or holes in the other, or some form of key and keyway connection which could be slid into and out of engagement might be employed.

I claim:

1. In governor control gear the combination of a control spring, a shouldered nut bearing on said spring, a fixed screw-threaded support for said nut, a governor shaft extension passing through said nut, two opposed friction clutch members carried on and rotating with said extension beyond said nut, two cooperating clutch members surrounding said friction clutch members, a lay-shaft parallel to said extension carrying driving means to engage said nut to rotate the same, gear trains connecting said lay-shaft with said cooperating clutch members, one train being such as to drive the lay-shaft in one direction and the other to drive it in the opposite direction, a clutch operating member operatively connected to said friction clutch members to move the same and so determine which cooperating clutch member is driven by said extension, and remote control means to operate said clutch operating member.

2. Governor control gear comprising the combination set out in claim 1, wherein the remote control means comprises electromagnetic means for operating said clutch operating member, and connections for energising said electromagnetic means under the control of a distant switch.

3. Governor control gear comprising the combination set forth in claim 1, wherein said opposed friction clutch members are carried on a sleeve horizontally movable upon said extension to the governor shaft, and the clutch operating member is connected to said sleeve to move it endwise.

4. Governor control gear comprising the combination set forth in claim 1, wherein the clutch operating member is a rocking lever and wherein a centralising spring is provided to keep the rocking lever normally in a central position where neither of the opposed clutch members is engaged.

5. Governor control gear comprising the combination set forth in claim 1, wherein means are provided to operate the layshaft by hand when desired and the clutch members are disengaged.

GEORGE HALLEWELL.

REFERENCES CITED

The following references are of record in the file of this patent:

UNITED STATES PATENTS

| Number | Name | Date |
| --- | --- | --- |
| 1,684,132 | Hewlett | Sept. 11, 1928 |
| 2,218,760 | MacNeil | Oct. 22, 1940 |
| 2,299,635 | MacNeil | Oct. 20, 1942 |
| 2,374,083 | Drake | Apr. 17, 1945 |